(12) United States Patent
Ananthakrishnan et al.

(10) Patent No.: US 8,769,316 B2
(45) Date of Patent: *Jul. 1, 2014

(54) DYNAMICALLY ALLOCATING A POWER BUDGET OVER MULTIPLE DOMAINS OF A PROCESSOR

(75) Inventors: Avinash N. Ananthakrishnan, Hillsboro, OR (US); Efraim Rotem, Haifa (IL); Doron Rajwan, Rishon Le-Zion (IL); Eliezer Weissmann, Haifa (IL); Nadav Shulman, Tel Mond (IL)

(73) Assignee: Intel Corporation, Santa Clara, CA (US)

( * ) Notice: Subject to any disclaimer, the term of this patent is extended or adjusted under 35 U.S.C. 154(b) by 297 days.

This patent is subject to a terminal disclaimer.

(21) Appl. No.: 13/225,677

(22) Filed: Sep. 6, 2011

(65) Prior Publication Data
US 2013/0061064 A1 Mar. 7, 2013

(51) Int. Cl.
*G06F 1/00* (2006.01)
*G06F 15/00* (2006.01)
*G05D 3/12* (2006.01)

(52) U.S. Cl.
USPC .............. 713/300; 345/501; 700/286; 712/28

(58) Field of Classification Search
USPC .............. 713/300; 345/501; 700/286; 712/28
See application file for complete search history.

(56) References Cited

U.S. PATENT DOCUMENTS

| | | | |
|---|---|---|---|
| 5,163,153 A | 11/1992 | Cole et al. | |
| 5,287,292 A | 2/1994 | Kenny et al. | |
| 5,522,087 A | 5/1996 | Hsiang | |
| 5,590,341 A | 12/1996 | Matter | |
| 5,621,250 A | 4/1997 | Kim | |
| 5,931,950 A | 8/1999 | Hsu | |
| 6,748,546 B1 | 6/2004 | Mirov et al. | |
| 6,792,392 B1 | 9/2004 | Knight | |
| 6,823,516 B1 | 11/2004 | Cooper | |
| 6,829,713 B2 | 12/2004 | Cooper et al. | |
| 6,908,227 B2 | 6/2005 | Fusu et al. | |
| 6,996,728 B2 | 2/2006 | Singh | |
| 7,010,708 B2 | 3/2006 | Ma | |
| 7,043,649 B2 | 5/2006 | Terrell | |

(Continued)

FOREIGN PATENT DOCUMENTS

| | | |
|---|---|---|
| EP | 1 282 030 A1 | 2/2003 |
| JP | 09-026900 | 1/1997 |
| JP | 2001-202155 | 7/2001 |

OTHER PUBLICATIONS

International Searching Authority, "Notification of Transmittal of the International Search Report and the Written Opinion of the International Searching Authority," mailed Mar. 14, 2013, in International application No. PCT/US2012/053726.

(Continued)

*Primary Examiner* — Stefan Stoynov
(74) *Attorney, Agent, or Firm* — Trop, Pruner & Hu, P.C.

(57) ABSTRACT

In one embodiment, the present invention includes a method for determining a power budget for a multi-domain processor for a current time interval, determining a portion of the power budget to be allocated to first and second domains of the processor, and controlling a frequency of the domains based on the allocated portions. Such determinations and allocations can be dynamically performed during runtime of the processor. Other embodiments are described and claimed.

17 Claims, 8 Drawing Sheets

(56) References Cited

U.S. PATENT DOCUMENTS

| | | | |
|---|---|---|---|
| 7,093,147 B2 | 8/2006 | Farkas et al. | |
| 7,111,179 B1 | 9/2006 | Girson et al. | |
| 7,146,514 B2 | 12/2006 | Kaushik et al. | |
| 7,194,643 B2 | 3/2007 | Gonzalez et al. | |
| 7,249,268 B2 | 7/2007 | Bhandarkar | |
| 7,272,730 B1 | 9/2007 | Acquaviva et al. | |
| 7,412,615 B2 | 8/2008 | Yokota et al. | |
| 7,434,073 B2 | 10/2008 | Magklis | |
| 7,437,270 B2 | 10/2008 | Song et al. | |
| 7,454,632 B2 | 11/2008 | Kardach et al. | |
| 7,502,948 B2 | 3/2009 | Rotem et al. | |
| 7,529,956 B2 | 5/2009 | Stufflebeam | |
| 7,539,885 B2 | 5/2009 | Ma | |
| 7,603,577 B2 | 10/2009 | Yamaji et al. | |
| 7,624,215 B2* | 11/2009 | Axford et al. | 710/260 |
| 7,650,518 B2 | 1/2010 | Allarey et al. | |
| 7,730,340 B2 | 6/2010 | Hu et al. | |
| 7,752,467 B2* | 7/2010 | Tokue | 713/300 |
| 7,797,512 B1 | 9/2010 | Cheng et al. | |
| 7,966,511 B2 | 6/2011 | Naveh et al. | |
| 8,015,427 B2 | 9/2011 | Miller et al. | |
| 2001/0044909 A1 | 11/2001 | Oh et al. | |
| 2002/0194509 A1 | 12/2002 | Plante et al. | |
| 2003/0061383 A1 | 3/2003 | Zilka | |
| 2004/0030940 A1 | 2/2004 | Espinoza-Ibarra et al. | |
| 2004/0064752 A1 | 4/2004 | Kazachinsky et al. | |
| 2004/0098560 A1 | 5/2004 | Storvik et al. | |
| 2004/0139356 A1 | 7/2004 | Ma | |
| 2004/0268166 A1 | 12/2004 | Farkas et al. | |
| 2005/0022038 A1 | 1/2005 | Kaushik et al. | |
| 2005/0033881 A1 | 2/2005 | Yao | |
| 2005/0046400 A1 | 3/2005 | Rotem | |
| 2005/0132238 A1 | 6/2005 | Nanja | |
| 2005/0223258 A1 | 10/2005 | Watts | |
| 2005/0288886 A1 | 12/2005 | Therien et al. | |
| 2005/0289365 A1 | 12/2005 | Bhandarkar | |
| 2006/0026447 A1 | 2/2006 | Naveh et al. | |
| 2006/0041766 A1 | 2/2006 | Adachi | |
| 2006/0050670 A1 | 3/2006 | Hillyard et al. | |
| 2006/0053326 A1 | 3/2006 | Naveh | |
| 2006/0059286 A1 | 3/2006 | Bertone et al. | |
| 2006/0069936 A1 | 3/2006 | Lint et al. | |
| 2006/0117202 A1 | 6/2006 | Magklis et al. | |
| 2006/0149975 A1 | 7/2006 | Rotem et al. | |
| 2006/0184287 A1 | 8/2006 | Belady et al. | |
| 2007/0005995 A1 | 1/2007 | Kardach et al. | |
| 2007/0016817 A1 | 1/2007 | Albonesi et al. | |
| 2007/0033425 A1 | 2/2007 | Clark | |
| 2007/0079294 A1 | 4/2007 | Knight | |
| 2007/0083779 A1 | 4/2007 | Misaka et al. | |
| 2007/0106428 A1 | 5/2007 | Omizo et al. | |
| 2007/0106827 A1 | 5/2007 | Boatright et al. | |
| 2007/0156992 A1 | 7/2007 | Jahagirdar | |
| 2007/0214342 A1 | 9/2007 | Newburn | |
| 2007/0234083 A1 | 10/2007 | Lee | |
| 2007/0239398 A1 | 10/2007 | Song et al. | |
| 2007/0245163 A1 | 10/2007 | Lu et al. | |
| 2007/0260895 A1 | 11/2007 | Aguilar et al. | |
| 2008/0005603 A1 | 1/2008 | Buch et al. | |
| 2008/0028240 A1 | 1/2008 | Arai et al. | |
| 2008/0028778 A1 | 2/2008 | Millet | |
| 2008/0077282 A1 | 3/2008 | Hartman et al. | |
| 2008/0077813 A1 | 3/2008 | Keller et al. | |
| 2008/0136397 A1* | 6/2008 | Gunther et al. | 323/299 |
| 2008/0250260 A1 | 10/2008 | Tomita | |
| 2008/0307240 A1* | 12/2008 | Dahan et al. | 713/320 |
| 2009/0006871 A1 | 1/2009 | Liu et al. | |
| 2009/0070605 A1 | 3/2009 | Nijhawan et al. | |
| 2009/0132844 A1 | 5/2009 | Allarey | |
| 2009/0150695 A1 | 6/2009 | Song et al. | |
| 2009/0150696 A1 | 6/2009 | Song et al. | |
| 2009/0158061 A1 | 6/2009 | Schmitz et al. | |
| 2009/0158067 A1 | 6/2009 | Bodas et al. | |
| 2009/0172375 A1 | 7/2009 | Rotem et al. | |
| 2009/0172428 A1 | 7/2009 | Lee | |
| 2009/0235105 A1 | 9/2009 | Branover et al. | |
| 2009/0235108 A1 | 9/2009 | Gold et al. | |
| 2009/0271141 A1 | 10/2009 | Coskun et al. | |
| 2009/0271646 A1 | 10/2009 | Talwar et al. | |
| 2009/0313489 A1 | 12/2009 | Gunther et al. | |
| 2010/0115309 A1 | 5/2010 | Carvalho et al. | |
| 2010/0146513 A1 | 6/2010 | Song | |
| 2010/0191997 A1 | 7/2010 | Dodeja et al. | |
| 2010/0332927 A1 | 12/2010 | Kurts et al. | |
| 2011/0022865 A1 | 1/2011 | Gunther et al. | |
| 2011/0072429 A1 | 3/2011 | Celeskey et al. | |
| 2011/0154090 A1 | 6/2011 | Dixon et al. | |
| 2011/0283124 A1 | 11/2011 | Branover et al. | |
| 2012/0053897 A1 | 3/2012 | Naffziger | |
| 2012/0066535 A1 | 3/2012 | Naffziger | |
| 2012/0079290 A1 | 3/2012 | Kumar | |
| 2012/0096288 A1 | 4/2012 | Bates et al. | |
| 2012/0110352 A1 | 5/2012 | Branover et al. | |
| 2012/0114010 A1 | 5/2012 | Branch | |
| 2012/0116599 A1* | 5/2012 | Arndt et al. | 700/291 |
| 2012/0173907 A1 | 7/2012 | Moses et al. | |
| 2013/0179704 A1 | 7/2013 | Ananthakrishnan | |
| 2013/0246825 A1 | 9/2013 | Shannon | |

OTHER PUBLICATIONS

David L. Hill, et al., "The Uncore: A Modular Approach to Feeding the High-Performance Cores," Intel Technology Journal, 2010, vol. 14, Issue 3, pp. 1-23.

U.S. Appl. No. 13/282,896, filed Oct. 27, 2011, entitled "Enabling a Non-Core Domain to Control Memory Bandwidth," by Avinash N. Ananthakrishnan, et al. (2492).

SPEC—Power and Performance, Design Overview V1.10, Standard Performance Information Corp., Oct. 21, 2008, 6 pages.

U.S. Appl. No. 13/070,700, "Obtaining Power Profile Information With Low Overhead," filed Mar. 24, 2011, by Robert Knight.

Anoop Iyer, et al., "Power and Performance Evaluation of Globally Asynchronous Locally Synchronous Processors," 2002, pp. 1-11.

Greg Semeraro, et al., "Hiding Synchronization Delays in a GALS Processor Microarchitecture," 2004, pp. 1-13.

Joan-Manuel Parcerisa, et al., "Efficient Interconnects for Clustered Microarchitectures," 2002, pp. 1-10.

Grigorios Magklis, et al., "Profile-Based Dynamic Voltage and Frequency Scalling for a Multiple Clock Domain Microprocessor," 2003, pp. 1-12.

Greg Semeraro, et al., "Dynamic Frequency and Voltage Control for a Multiple Clock Domain Architecture," 2002, pp. 1-12.

Greg Semeraro, "Energy-Efficient Processor Design Using Multiple Clock Domains with Dynamic Voltage and Frequency Scaling," 2002, pp. 29-40.

Diana Marculescu, "Application Adaptive Energy Efficient Clustered Architectures," 2004, pp. 344-349.

L. Benini, et al., "System-Level Dynamic Power Management," 1999, pp. 23-31.

Ravindra Jejurikar, et al., "Leakage Aware Dynamic Voltage Scaling for Real-Time Embedded Systems," 2004, pp. 275-280.

Ravindra Jejurikar, et al., "Dynamic Slack Reclamation With Procrastination Scheduling in Real-Time Embedded Systems," 2005, pp. 111-116.

R. Todling, et al., "Some Strategies for Kalman Filtering and Smoothing," 1996, pp. 1-21.

R.E. Kalman, "A New Approach to Linear Filtering and Prediction Problems," 1960, pp. 1-12.

Intel Technology Journal, "Power and Thermal Management in the Intel Core Duo Processor," May 15, 2006, pp. 109-122.

U.S. Appl. No. 13/169,260, filed Jun. 27, 2011, entitled "Increasing Power Efficiency of Turbo Mode Operation in a Processor," by James S. Burns, et al.

Intel Developer Forum, IDF2010, "Power and Thermal Management," 2010, 7 pages.

(56) References Cited

OTHER PUBLICATIONS

U.S. Appl. No. 13/282,947, filed Oct. 27, 2011, entitled "Controlling Operating Frequency of a Core Domain Via a Non-Core Domain of a Multi-Domain Processor," by Avinash N. Ananthakrishnan, et al. (2493).

U.S. Appl. No. 13/285,414, filed Oct. 31, 2011, entitled "Controlling a Turbo Mode Frequency of a Processor," by Avinash N. Ananthakrishnan, et al. (2494).

U.S. Appl. No. 13/247,580, filed Sep. 28, 2011, entitled "Controlling Temperature of Multiple Domains of a Multi-Domain Processor," by Avinash N. Ananthakrishnan, et al. (2496).

U.S. Appl. No. 13/285,465, filed Oct. 31, 2011, entitled "Dynamically Controlling Cache Size to Maximize Energy Efficiency," by Avinash N. Ananthakrishnan, et al. (2497).

Intel Developer Forum, IDF2010, Opher Kahn, et al., "Intel Next Generation Microarchitecture Codename Sandy Bridge: New Processor Innovations," Sep. 13, 2010, 58 pages.

* cited by examiner

DYNAMICALLY ALLOCATING A POWER BUDGET OVER MULTIPLE DOMAINS OF A PROCESSOR

BACKGROUND

As technology advances in the semiconductor field, devices such as processors incorporate ever-increasing amounts of circuitry. Over time, processor designs have evolved from a collection of independent integrated circuits (ICs), to a single integrated circuit, to multicore processors that include multiple processor cores within a single IC package. As time goes on, ever greater numbers of cores and related circuitry are being incorporated into processors and other semiconductors.

Multicore processors are being extended to include additional functionality by incorporation of other functional units within the processor. One issue that arises is that the different circuitry can consume differing amounts of power based on their workloads. However, suitable mechanisms to ensure that these different units have sufficient power do not presently exist.

DETAILED DESCRIPTION

In various embodiments, a power budget of a processor including multiple domains can be dynamically apportioned at run time. As used herein the term "domain" is used to mean a collection of hardware and/or logic that operates at the same voltage and frequency point. As an example, a multicore processor can further include other non-core processing engines such as fixed function units, graphics engines, and so forth. Such processor can include at least two independent domains, one associated with the cores (referred to herein as a core domain) and one associated with a graphics engine (referred to herein as a graphics domain). Although many implementations of a multi-domain processor can be formed on a single semiconductor die, other implementations can be realized by a multi-chip package in which different domains can be present on different semiconductor die of a single package.

In a multi-domain processor, the multiple domains collectively share a single power budget. Accordingly, the higher the frequency at which, e.g., the core domain is operating, the higher the power consumed by the core domain. And in turn, the higher the power consumed by the core domain, there is less power left for the graphics domain to consume and vice versa. On workloads that utilize both one or more cores of a core domain and a graphics engine of a graphics domain, embodiments may at run time dynamically re-partition how a package power budget is shared between these domains. Thus embodiments provide a power balancing mechanism that can be implemented between the different domains of a multicore processor. For ease of discussion, embodiments described herein are with regard to a multi-domain processor including a core domain and a graphics domain that can share a power budget. However understand the scope of the present invention is not limited in this regard and additional domains can be present. As another example, each core can be allocated to a different domain and each of the domains can be provided with a dynamically re-partitionable amount of a power budget. Furthermore, in addition to core domains and graphics domains, understand that additional domains can be present. For example, another domain can be formed of other processing units such as fixed function units, accelerators or so forth. And a still further domain can be provided for certain management agents of a processor, which can receive a fixed portion of a total power budget.

In various embodiments a power budget management (PBM) algorithm may be executed by logic such as logic of a power control unit (PCU) of a processor to control the power of an entire processor or an individual domain to a configured power limit. Such algorithm may be based in part on various processor parameters. One such parameter is a guaranteed frequency (P1), which is a frequency that a domain is guaranteed to operate at and not exceed power or thermal specifications of the product. A processor can be tested, e.g., during fabrication to determine this guaranteed frequency, which can be stored in a non-volatile storage or other mechanism of the processor. In various embodiments such guaranteed frequency can be set on a per domain basis. This guaranteed frequency can be fixed upon manufacture and not changed, or in certain embodiments this frequency can be dynamically updated, e.g., as a processor ages due to various degradation mechanisms of the semiconductor product. In various embodiments, all power domains of a processor can be run at their respective guaranteed frequency simultaneously and the processor should not exceed power or thermal specifications.

Note that this guaranteed frequency can correspond to a performance state of a processor, namely a P1 processor state. According to an operating system (OS)-based mechanism, namely the Advanced Configuration and Platform Interface (ACPI) standard (e.g., Rev. 3.0b, published Oct. 10, 2006), a processor can operate at various performance states or levels, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic state in which, when power and/or thermal budget is available, processor hardware can configure the processor or at least portions thereof to operate at a higher than guaranteed frequency. In many implementations a processor can include multiple so-called bin frequencies above this P1 frequency.

Another parameter to be used in a PBM algorithm is a maximum turbo frequency (P0), which is a highest frequency at which a domain can operate. This maximum turbo frequency thus is the highest end of multiple bin frequencies greater than the P1 frequency and corresponds to a maximum non-guaranteed highest performance level that can be achieved. Note that at this frequency there are no guarantees on whether the domain exceeds the power or thermal specifications of the processor. In many situations, device characterization during fabrication of a processor can be used to set a maximum turbo frequency, which can be set on a per domain basis. Bin frequencies up to the maximum turbo frequency can be stored in a non-volatile storage or other mechanism of a processor. Note that it is not guaranteed that a processor with more than one domain is able to simultaneously run all domains at their respective maximum turbo frequencies. It is also not guaranteed that a given domain can run at its maximum turbo frequency while other domains are running at their respective guaranteed frequencies.

Embodiments may dynamically calculate a package power budget which is a metric that measures the power headroom available to the processor for a given time interval. Depending on this power budget, one or more domains may be controlled to enter into a turbo mode in which a frequency can be raised above the guaranteed frequency.

In one embodiment, the power budget can be calculated using the following equation:

$$E_n = E_{n-1}*alpha + (1-alpha)*(Power\_Limit*deltaT - Energy) \quad [1]$$

where $E_n$=energy budget for the current (Nth) evaluation instant (which can be measured in Joules);

$E_{n-1}$=energy budget carried forward from the previous evaluation instant (which can be measured in Joules);

Power_limit=threshold power level that the processor is configured to maintain, and which may correspond to a thermal design processor (TDP). This thermal design power may thus be a measure of an average power at which the processor can operate. In many implementations, this TDP can be measured in units of power, namely Watts (W). For example, a processor can be rated at a TDP of 40 W. This means that on average, the processor can withstand a power consumption level of 40 W. But at any instant, its instantaneous power consumption level may be higher or lower than this TDP level.

deltaT=evaluation interval at which a power budget is computed, which in one embodiment may be approximately 1 millisecond (ms);

Energy=energy consumed during the previous evaluation interval, which can be measured in Joules. In one embodiment, energy can be estimated based on counters that trace various micro-architectural activity. For example, an energy value can be associated with each micro-operation retiring, or each cache access. Then based on these events occurring over the time interval, energy consumed can be determined. In another embodiment, energy can be obtained from reading external current and voltage monitoring sensors such as current monitoring circuitry implemented in a voltage regulator; and alpha=rate of power budget decay, which can be a function of the thermal resistance of a heatsink and cooling solution of the platform. In general, an alpha value can vary inversely with the selected deltaT. Where the deltaT is relatively small, e.g., 1 ms, the alpha value may be higher, and vice-versa.

In various embodiments, a user may be provided with control, e.g., by user-level software to enable the software to determine how package power budget is shared between different domains. In one embodiment, this control can be exposed by way of configuration information that can be set by such software, e.g., as entries in one or more configuration registers. In one particular embodiment of a processor having a first domain and a second domain (also referred to as "planes"), two such configuration registers may be provided as follows in Table 1:

TABLE 1

| [31.5] | [4.0] |
|---|---|
| Primary Plane Turbo Power Policy | |
| Reserved | POLICY_FIRST |
| Secondary Plane Turbo Power Policy | |
| Reserved | POLICY_SECOND |

These two values, referred to as policy values (and in the example of Table 1 can be 5-bit values), can be used to determine how a package power budget is to be shared between these two domains. For purposes of discussion herein, assume that these two domains are a core domain and a graphics domain. Furthermore, the core domain is referred to also herein as an "IA" domain, referring to processor cores in accordance with an Intel Architecture™ instruction set architecture (ISA) (although embodiments can be used in connection with processors of other manufacturers and ISAs), while the graphics domain can be referred to as a "GT" domain, which refers to an embedded graphics engine that can be implemented on the same die as such IA cores. In one embodiment, the following equations may govern how the package power budget is shared between core and graphics domains:

$$IA\_percentage\_of\_package\_budget = 0.5 + (POLICY\_FIRST - POLICY\_SECOND)/62 \quad [2]$$

$$GT\_percentage\_of\_package\_budget = 0.5 + (POLICY\_SECOND - POLICY\_FIRST)/62 \quad [3]$$

More generally, for the case of N domains over which an allocation of a package power budget is based on priority over these N domains, the following equations can be used:

$$BIAS_x = \frac{POLICY_x}{\sum POLICY_i} \quad [4]$$

$$E_{domain(x)} = E_n * BIAS_x \quad [5]$$

Here a BIAS can be calculated for each domain x based on the policy value (x) of that domain and the sum of total policy values of all the domains, and again En is the energy budget at time instant n.

In some embodiments, these configuration registers that store policy values can be controlled generally as incrementing counters. That is, in some embodiments both an OS or other scheduler for the core domain and a graphics driver, which is software and/or firmware that controls various parameters of the graphics engine such as its frequency of operation and so forth, can make requests for a given frequency of operation to the PCU. If the requested frequency is not allowed (e.g., due to a power or thermal limit), the corresponding entity can increment the associated policy value. Thus over time, as a given entity's requests for a higher frequency are not granted, the policy values can be raised. These policy values similarly can be decremented. For example, policy values can be decremented on reset and when a domain gets the frequency it requested, or if a workload profile on the domain changes. For example if the workload utilization on that domain decreases (e.g., C0 residency decreases), the OS or driver software can chose to reduce the policy value for that domain. Then based on these policy values and the above Equations 2 and 3, a percentage of the package budget, e.g., as determined in accordance with Equation 1, can be allocated to each of the domains by controlling their frequency and/or voltage accordingly. In various embodiments, the above mechanism of splitting budget between the domains is done on a continuous basis every deltaT time interval.

Figure 1:
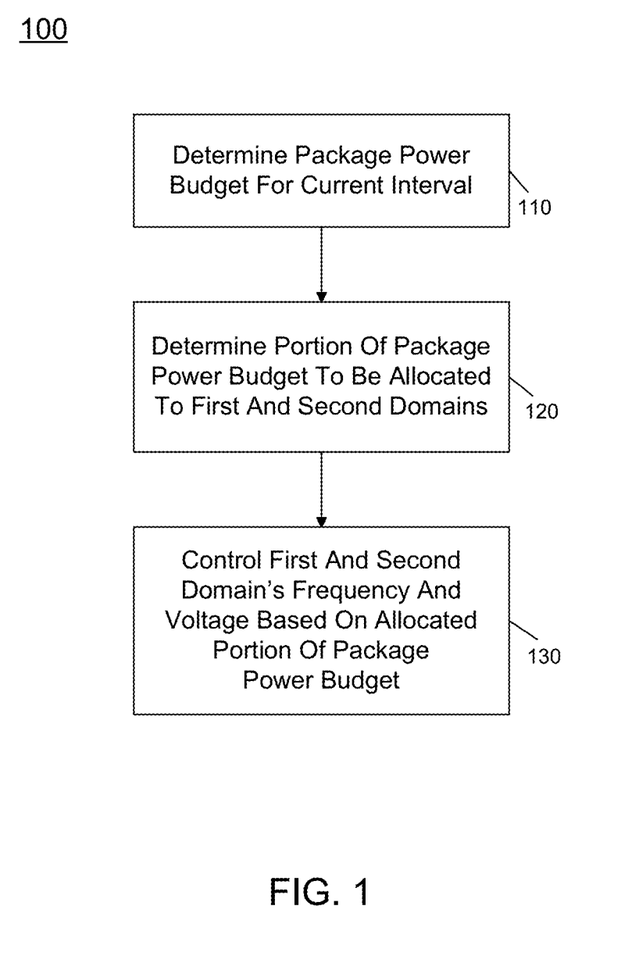
FIG. 1 is a flow diagram of a high level method of performing power budget allocations between multiple domains in accordance with an embodiment of the present invention.

Referring now to FIG. 1, shown is a flow diagram of a high level method of performing power budget allocations between multiple domains in accordance with an embodiment of the present invention. As shown in FIG. 1, method 100 can be implemented by logic within a processor, such as power sharing logic of a PCU or other power controller. As seen, method 100 may begin by determining a package power budget for a current interval (block 110). In various embodiments, this determination can be made in accordance with Equation 1 above, although other manners of determining a package power budget for a given interval can occur.

Next, at block 120 a portion of this package power budget to be allocated amongst multiple domains can be determined. For purposes of discussion herein, assume a multi-domain processor including a core domain and a graphics domain. Different manners of allocating or sharing a power budget between these domains can occur in different embodiments. In general however, information regarding the manner in which sharing is to be performed, e.g., as indicated within configuration registers that can be set by system level and/or user-level software in addition to any floors or minimum values to be allocated to the different domains, can be considered in this determination. Accordingly, block 120 determines the allocation of the package power budget to be provided to each domain. Thus control next passes to block 130 where these domains can be controlled in accordance with this allocation. More specifically at block 130 a frequency and/or voltage of these domains can be updated based on the allocated portion of the power budget. In this way, for the given interval each of the domains can execute operations in accordance with this budget. While shown at this high level in the embodiment of FIG. 1, understand the scope of the present invention is not limited in this regard.

To handle cases where a certain amount of budget may be desired to be reserved for a domain, embodiments may support additional tunable parameters. These parameters, which may also be exposed by way of configuration registers or in another manner, can reserve a predetermined amount of budget for a given domain. In one embodiment, these parameters may be referred to as reservation values and can be used to identify a minimum power budget (e.g., in terms of Watts) to be allocated to a given domain. In the described multi-domain processor, these parameters may be as follows:

Min_reserved_for_IA=amount of budget to be reserved for the core domain; and

Min_reserved_for_GT=amount of budget to be reserved for the graphics domain.

Figure 2:
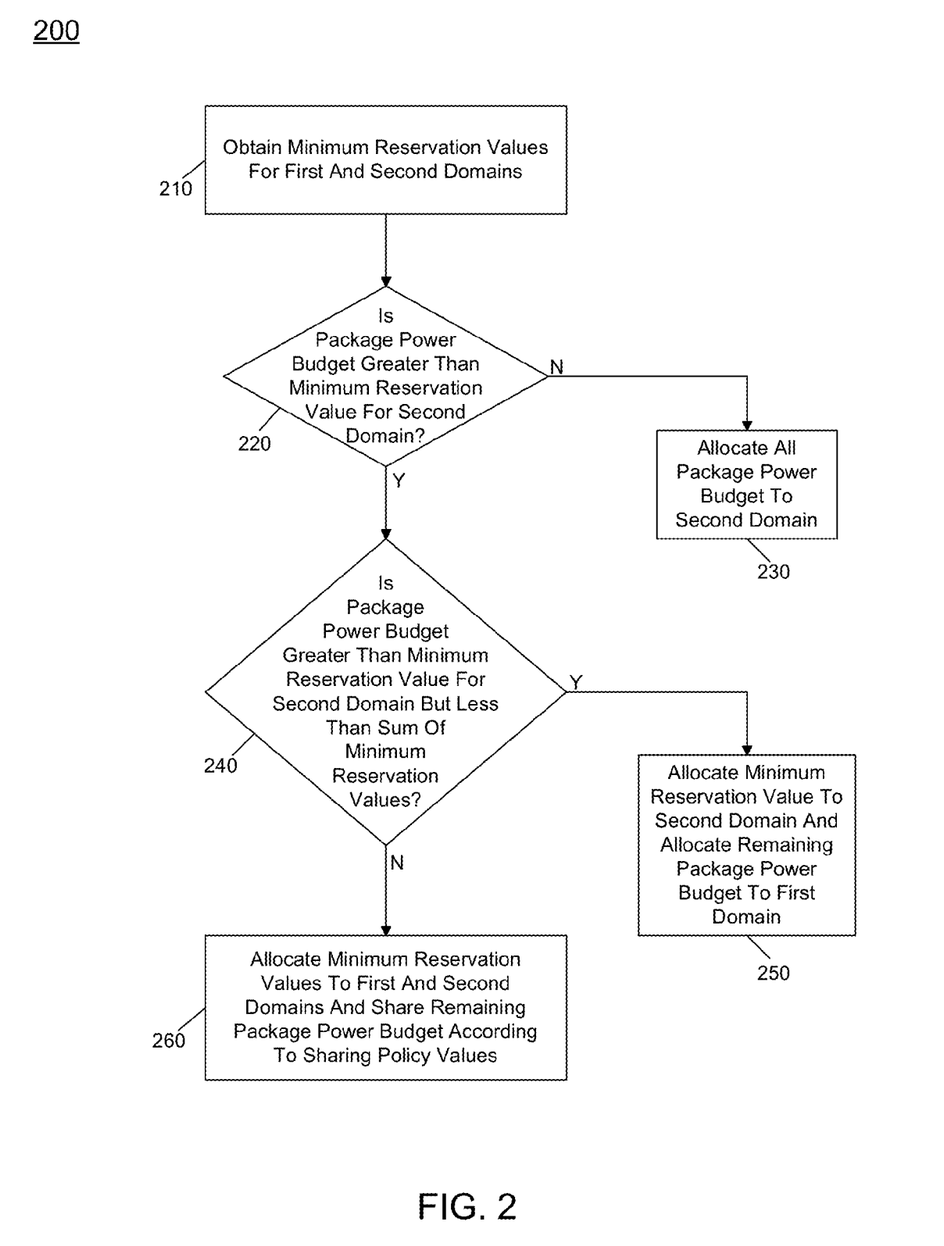
FIG. 2 is a flow diagram of a method describing further details of allocating a package power budget between multiple domains in accordance with an embodiment of the present invention.

Referring now to FIG. 2, shown is a flow diagram of a method describing further details of allocating a package power budget between multiple domains in accordance with an embodiment of the present invention. As shown in FIG. 2, method 200 may similarly be performed by power sharing logic of a PCU or other power controller of a processor. Method 200 can begin by obtaining minimum reservation values for the domains (block 210). As in the embodiment of FIG. 1 assume a multi-domain processor including at least a core domain and a graphics domain. These minimum reservation values can be obtained, e.g., from configuration registers set by user-level software to indicate a floor level corresponding to a minimum amount of power budget to be allocated to the given domain. Of course, these values instead can be set by other entities such as an OS and/or graphics driver, respectively for the core and graphics domains.

At diamond 220 it can be determined whether the package power budget is greater than the minimum reservation value for the second domain. The package power budget can be calculated in different manners, but assume for purposes of discussion that it is calculated in accordance with Equation 1 above. If the budget is not greater than this minimum reservation value, control passes to block 230 where all of the package power budget can be allocated to the second domain. Thus the embodiment shown in FIG. 2 favors providing power to the second domain (which may correspond to a graphics domain) over the first domain (which may correspond to a core domain). Although shown with this preference in FIG. 2, understand the scope of the present invention is not limited in this regard, and in other implementations the preference can be in the other direction. And note that this preference can be dynamically changed based on a workload of a processor (e.g., a graphics intensive workload versus a computing intensive workload). As an example, a preference for the graphics domain can be hard mapped to first allocate to the graphics domain and then to the core domain to share the rest between core domain and graphics domain. This decision can be made based on the POLICY_FIRST and POLICY_SECOND values. For example, if POLICY_FIRST is greater than POLICY_SECOND, the preference may be to first allocate to the core domain and then allocate the remaining budget to graphics domain and so on.

If instead at diamond 220 it is determined that the package power budget is greater than the minimum reservation value for the second domain, control passes to diamond 240, where it can be determined whether the package power budget is greater than this minimum reservation value but less than the sum of the minimum reservation values for the two domains. If this is the case, control passes to block 250 where the minimum reservation value can be allocated to the second domain, and any remaining package power budget can be allocated to the first domain. Note again with regard to this allocation that a preference is made in favor of the second domain over the first domain. But in another implementation (or different workload), the preferences can be in the other direction.

Finally, if the package power budget is greater than the sum of the minimum reservation values, control passes to block 260 where the minimum reservation values can be allocated to the domains, and then any remaining package power budget can be shared according to sharing policy values. These sharing policy values may also be obtained, e.g., from the configuration registers of Table 1. As one example, these sharing values can be set at equal values such that the remaining power budget can be allocated equally amongst the two domains. However in other examples, one of the domains may have a higher policy sharing value and thus may obtain more of the available power budget. Although shown with this particular implementation in the embodiment of FIG. 2, understand the scope of the present invention is not limited in this regard. For example, in products having greater than two domains, the analysis may proceed similarly but the available power budget is shared amongst the m>2 variable power domains based on policy values, reservation values, and/or preferences for each of the domains.

Thus, based on the scenarios in FIG. 2 using the programmable reservation parameters, there can be four potential cases with regard to the packet budget (and assuming that the graphics domain has a higher preference value than the core domain):
1. Package budget<Min_reserved_for_GT. In this case the graphics domain receives the entire package budget, and the core domain receives no part of the package budget.
2. Min_reserved_for_IA+min_reserved_for_GT>Package budget>Min reserved for GT. In this case the graphics domain receives its minimum reservation value and the core domain receives the remaining budget (i.e., Packet budget−Min reserved for GT).
3. Package budget>Min_reserved_for_IA+Min_reserved_for_GT. In this case the graphics domain receives its minimum reservation value and a portion of the budget that exceeds the sum of the minimum reservation values. Identically the core domain receives its minimum reservation value and a portion of the budget that exceeds the sum of the minimum reservation values. The portions allocated to the two domains can be a function of POLICY_FIRST and POLICY_SECOND (of Table 1) as follows:

Pkg_budget_for_IA=Min Guaranteed IA+PKG_BUDGET*IA_percentage_of_package_budget.   [6]

Similarly, Pkg_budget_GT=Min Guaranteed GT+PKG_BUDGET*GT_percentage_of_package_budget.   [7]

Figure 3:
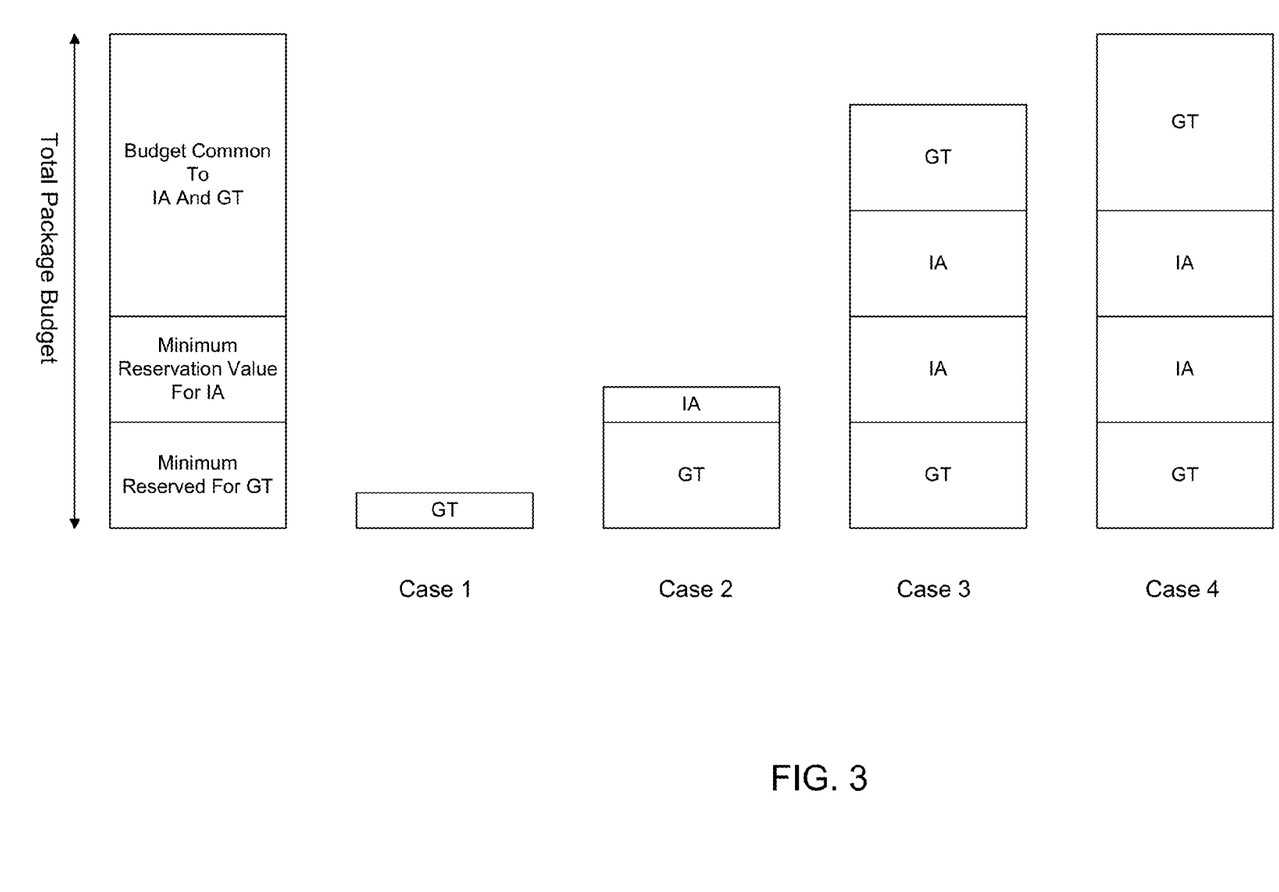
FIG. 3 is a graphical illustration of allocation of a power budget to multiple domains in accordance with one embodiment of the present invention.

4. Package budget>Min reserved for IA+GT but with a non-uniform split. In this case the graphics domain receives its minimum reservation value and a portion of the budget that exceeds the sum of the minimum reservation values. The portion of budget given to the graphics domain is governed by Equation 7 listed above (and that allocated to the core domain in Equation 6). Based on the POLICY_FIRST and POLICY_SECOND values, the excess power budget can by split asymmetrically between the domains. For example if POLICY_FIRST is 0 and POLICY_SECOND is 16, the graphics domain receives 75% of the package budget and the core domain receives the remaining 25%. FIG. 3 is a graphical illustration of the different allocation cores for these four cases, which are listed as cases 1-4 in the illustration.

Figure 4:
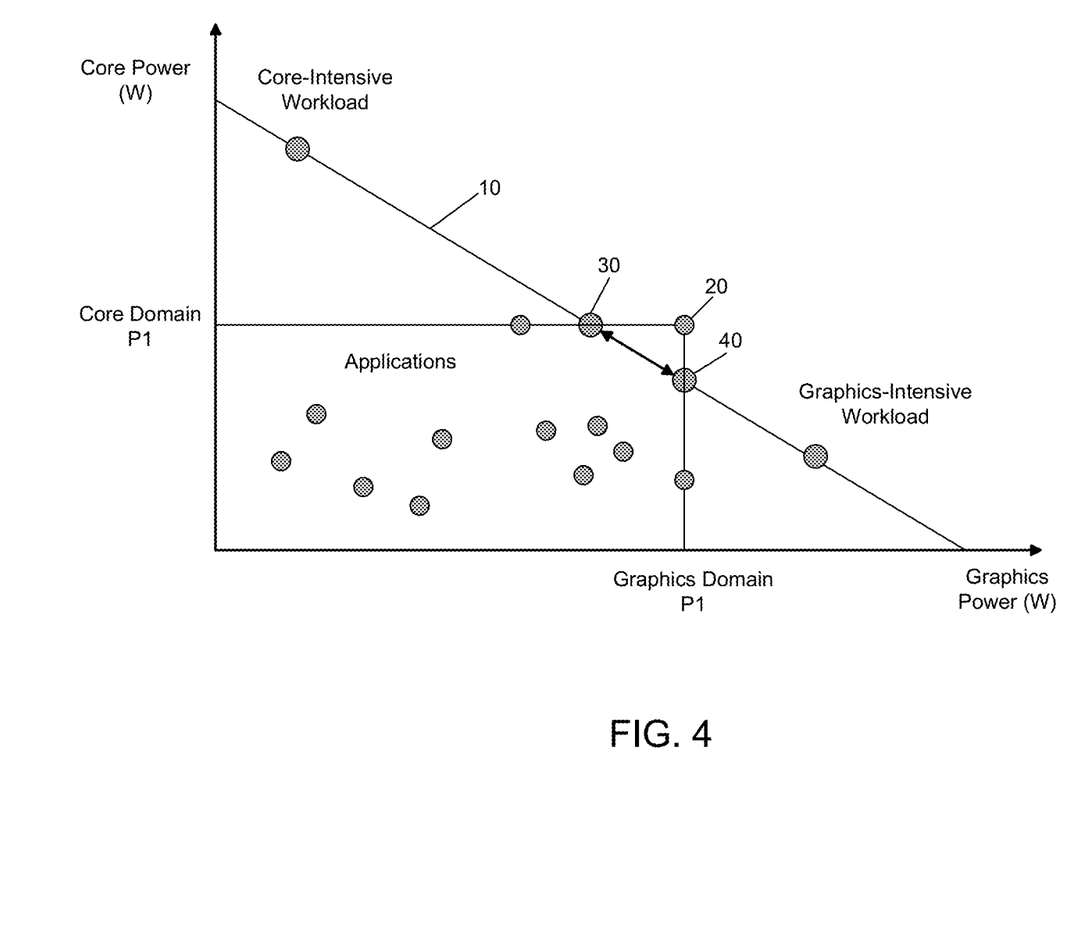
FIG. 4 is a graphical illustration of power consumption for a variety of workloads in accordance with one embodiment of the present invention.
Figure 5:
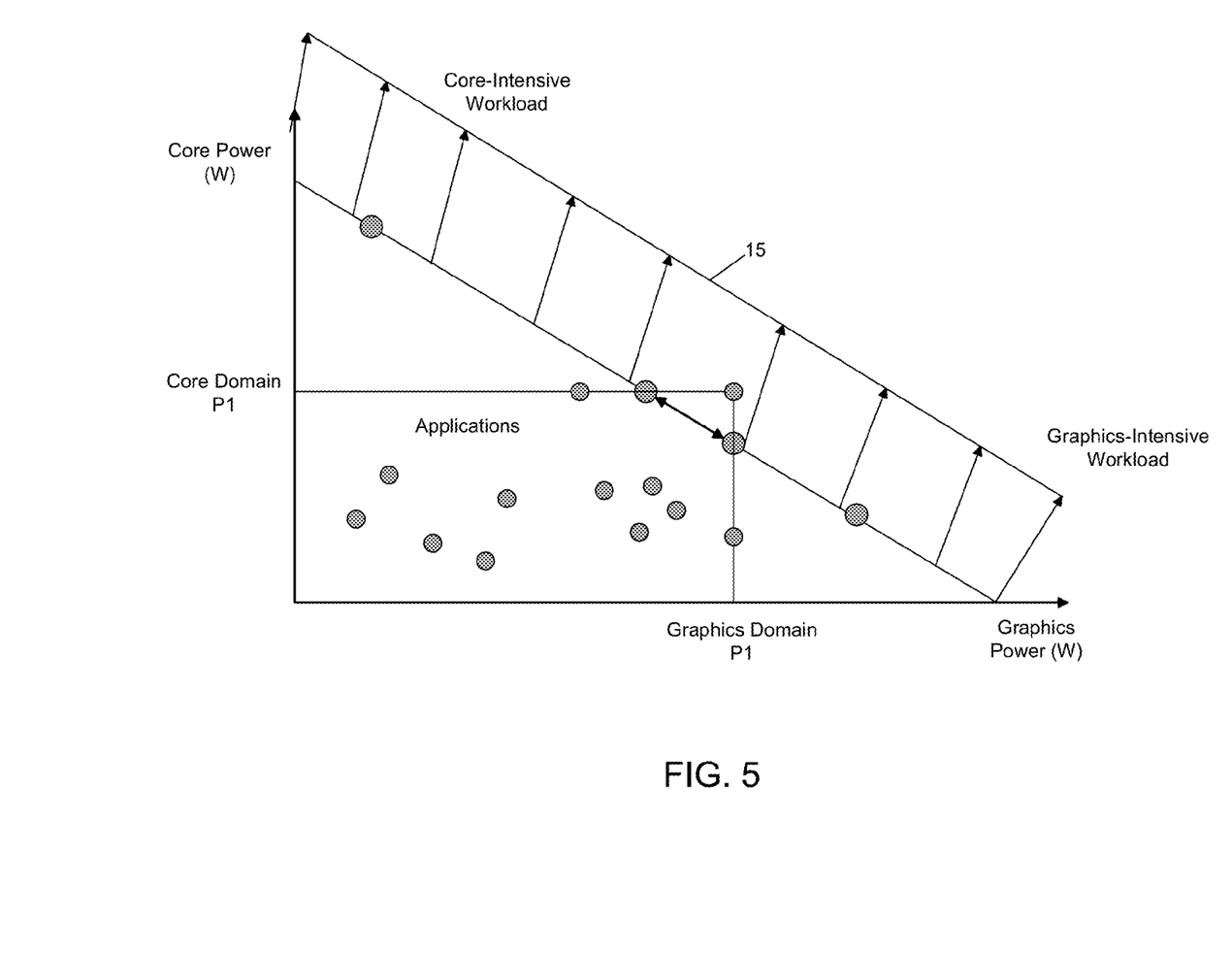
FIG. 5 is another graphical illustration of power consumption for a variety of workloads in accordance with an embodiment of the present invention.

To further illustrate how different domains can share a power budget, and furthermore how this power budget can shift between the domains based on a type of workload being executed, reference can be made to FIGS. 4 and 5, which are graphical illustrations of various allocations of a power budget between multiple domains in different workload environments.

Referring first to FIG. 4, shown is a power consumption diagram in which a graphics domain power consumption is on the X-axis and a core domain power consumption is on the Y-axis. As seen, each domain may have an independent specification power level, which may correspond to a P1 or thermal design power level, which is the maximum guaranteed frequency at which the domain can execute. In addition, the domains can execute at higher power levels in a turbo mode (namely, a higher than guaranteed operating frequency, corresponding to a P0 performance state). As seen, a line 10 joining the axes corresponds to a total package power budget. When a core-intensive workload is executed, the portion of the total power budget allocated to the core domain can be higher, and in turn when a graphics-intensive workload is being executed, the portion of the total package power budget being allocated to the graphics domain can be higher.

As further seen, the sum of the power budgets when both domains are executing at their highest guaranteed frequency corresponds to a sum of the maximum power budgets at a point 20. This sum can exceed the total package power budget and thus, the realistic current maximum power consumption level may fall on a range between points 30 and 40. Operating at points 30 or 40 depends on how the power budget is split between the core and graphics domains. Prioritizing towards the graphics domain will result in operating at point 40 and prioritizing towards the core domain will result in operating at point 30.

However as seen in FIG. 5, it is possible that both domains can execute at their guaranteed maximum operating frequency and not violate the total package power budget in a turbo mode, as the total package power budget can be set to a higher level 15, when the turbo mode is available. Thus for at least short time periods, a turbo mode may be available in which both domains can at least meet their maximum guaranteed operating frequency.

Figure 6:
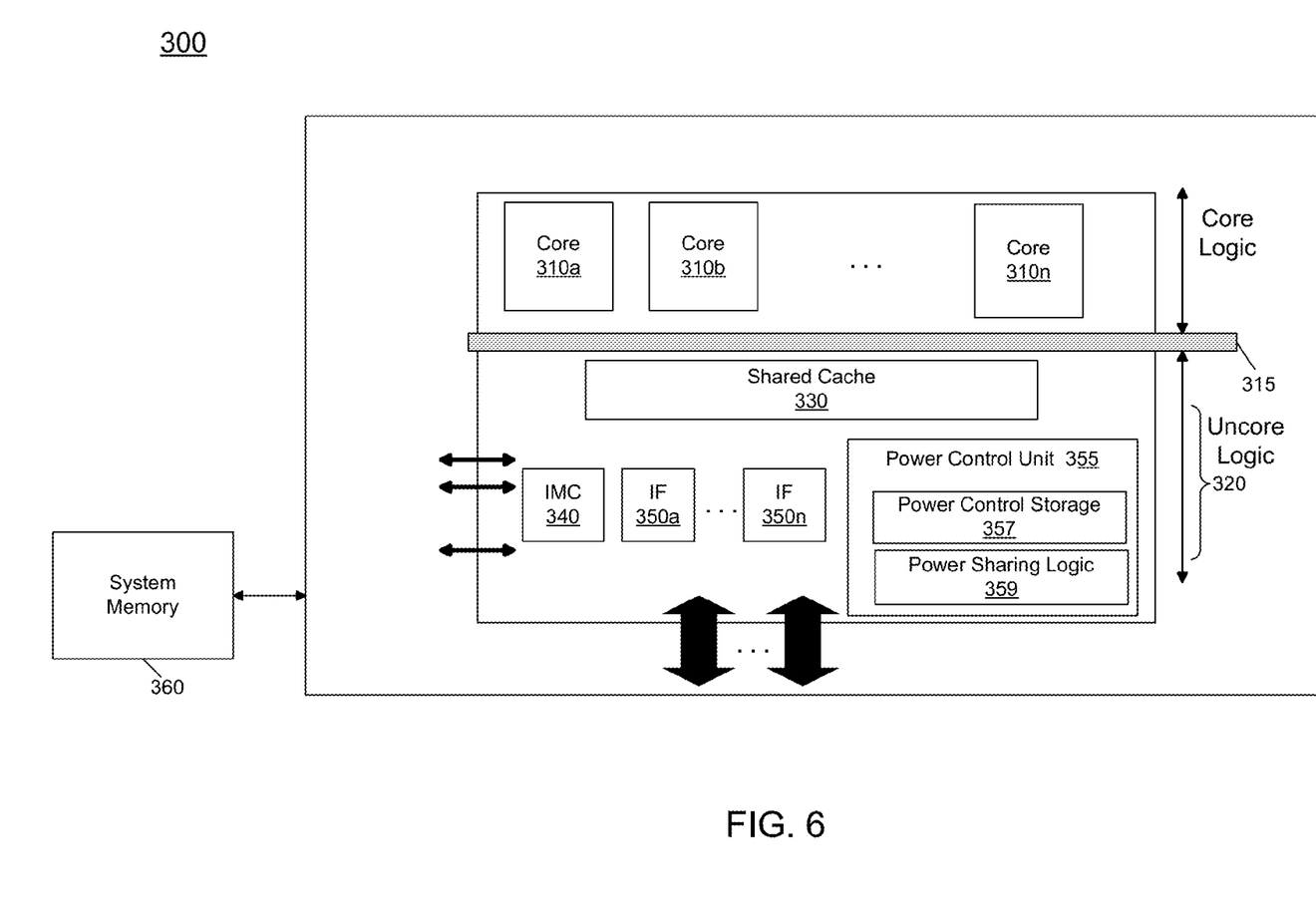
FIG. 6 is a block diagram of a processor in accordance with an embodiment of the present invention.

Referring now to FIG. 6, shown is a block diagram of a processor in accordance with an embodiment of the present invention. As shown in FIG. 6, processor 300 may be a multicore processor including a plurality of cores $310_a$-$310_n$. In one embodiment, each such core may be of an independent power domain and can be configured to operate at an independent voltage and/or frequency, and to enter turbo mode when available headroom exists. The various cores may be coupled via an interconnect 315 to a system agent or uncore 320 that includes various components. As seen, the uncore 320 may include a shared cache 330 which may be a last level cache. In addition, the uncore may include an integrated memory controller 340, various interfaces 350 and a power control unit 355.

In various embodiments, power control unit 355 may include a power sharing logic 359, which may be a logic to perform dynamic control and re-allocation of an available power budget between multiple independent domains of the processor. In the embodiment of FIG. 6, assuming that each core is of an independent power domain, logic 359 can calculate an available power budget for a given time interval and dynamically allocate portions of this available power budget to the different cores. Such allocations can be on equal footing, or preferenced to one or more of the domains. These allocations can thus be based on policy values for the different domains, minimum reservation values for the different domains, and preference values. In one embodiment, these preference values may be of a ranked order in which each domain is ranked according to its preference. For example, in a two domain system the two domains can be ranked as a higher and lower preference such that an algorithm as discussed in FIG. 2 can allocate a minimum reservation value to the higher ranked domain when there is insufficient power budget for both domains' minimum reservation values. And of course such rankings can be extended to additional domains. As further seen in FIG. 6 to provide for storage of various policy values, minimum reservation values and preference values, a power control storage 357 may further be present within PCU 355 to store these various values. Although shown at this location in the embodiment of FIG. 6, understand that the scope of the present invention is not limited in this regard and the storage of this information can be in other locations, such as configuration registers, non-volatile storage or the like.

With further reference to FIG. 6, processor 300 may communicate with a system memory 360, e.g., via a memory bus. In addition, by interfaces 350, connection can be made to various off-chip components such as peripheral devices, mass storage and so forth. While shown with this particular implementation in the embodiment of FIG. 6, the scope of the present invention is not limited in this regard.

Figure 7:
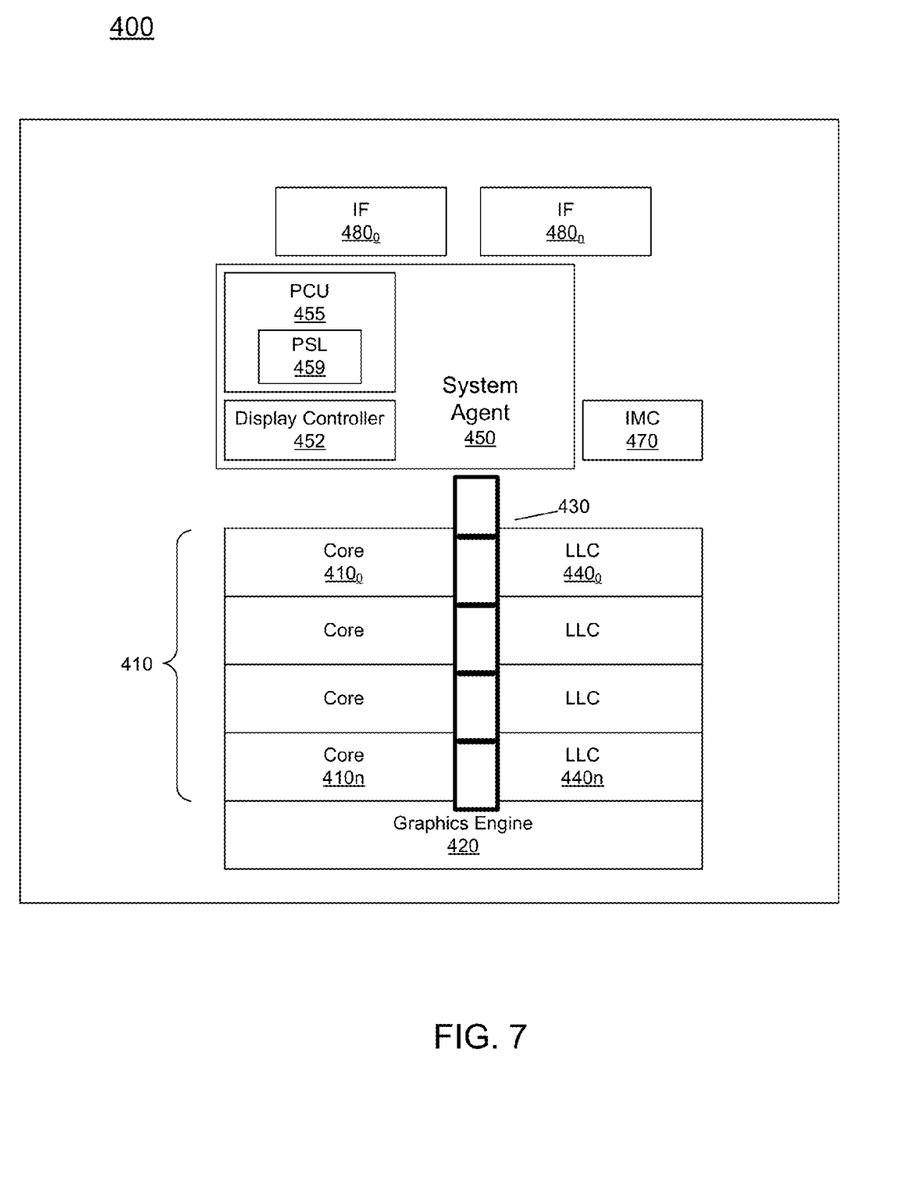
FIG. 7 is a block diagram of a multi-domain processor in accordance with another embodiment of the present invention.

Referring now to FIG. 7, shown is a block diagram of a multi-domain processor in accordance with another embodiment of the present invention of the present invention. As shown in the embodiment of FIG. 7, processor 400 includes multiple domains. Specifically, a core domain 410 can include a plurality of cores 410a-410n, a graphics domain 420 can include one or more graphics engines, and a system agent domain 450 may further be present. In various embodiments, system agent domain 450 may execute at a fixed frequency and may remain powered on at all times to handle power control events and power management such that domains 410 and 420 can be controlled to dynamically enter into and exit low power states. In addition, these domains can dynamically share a package power budget between them in accordance with an embodiment of the present invention. Each of domains 410 and 420 may operate at different voltage and/or power.

Note that while only shown with three domains, understand the scope of the present invention is not limited in this regard and additional domains can be present in other embodiments. For example, multiple core domains may be present each including at least one core. In this way, finer grained control of the amount of processor cores that can be executing at a given frequency can be realized.

In general, each core 410 may further include low level caches in addition to various execution units and additional processing elements. In turn, the various cores may be coupled to each other and to a shared cache memory formed of a plurality of units of a last level cache (LLC) $440_0$-$440_n$. In various embodiments, LLC 450 may be shared amongst the cores and the graphics engine, as well as various media processing circuitry. As seen, a ring interconnect 430 thus couples the cores together, and provides interconnection between the cores, graphics domain 420 and system agent circuitry 450.

In the embodiment of FIG. 7, system agent domain 450 may include display controller 452 which may provide control of and an interface to an associated display. As further seen, system agent domain 450 may include a power control unit 455 which can include a power sharing logic 459 in accordance with an embodiment of the present invention. In various embodiments, this logic may execute algorithms such as shown in FIGS. 1 and 2 to thus dynamically share an available package power budget between the core domain and the graphics domain.

As further seen in FIG. 7, processor 400 can further include an integrated memory controller (IMC) 470 that can provide for an interface to a system memory, such as a dynamic random access memory (DRAM). Multiple interfaces $480_0$-$480_n$ may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with a Intel® Quick Path Interconnect (QPI) protocol may also be provided. Although shown at this high level in the embodiment of FIG. 7, understand the scope of the present invention is not limited in this regard.

Thus in various embodiments, a technique is provided to enable selection of how much of a common power envelope can be allocated to each of multiple independent power domains of a semiconductor device. Note that this power sharing approach is different than conventional power management control of processing engines, which simply acts to select one or more engines to be placed into a low power state, but does not provide for the dynamic power sharing of a power budget between domains as described herein. That is, embodiments provide a mechanism to dynamically share the power budget between different compute components in the same die. As a result, a power budget or power headroom can be reallocated between cores and graphics engine when they are both integrated on the same die. Although embodiments described herein are with regard to a multi-domain processor having at least one core domain and a graphics domain, the scope of the present invention is not so limited, and can be extended to any integrated semiconductor device where common power resources are dynamically allocated between multiple compute entities.

Embodiments thus may dynamically redistribute power between core domain and graphics domain, enabling flexibility to handle various different workload requirements.

Figure 8:
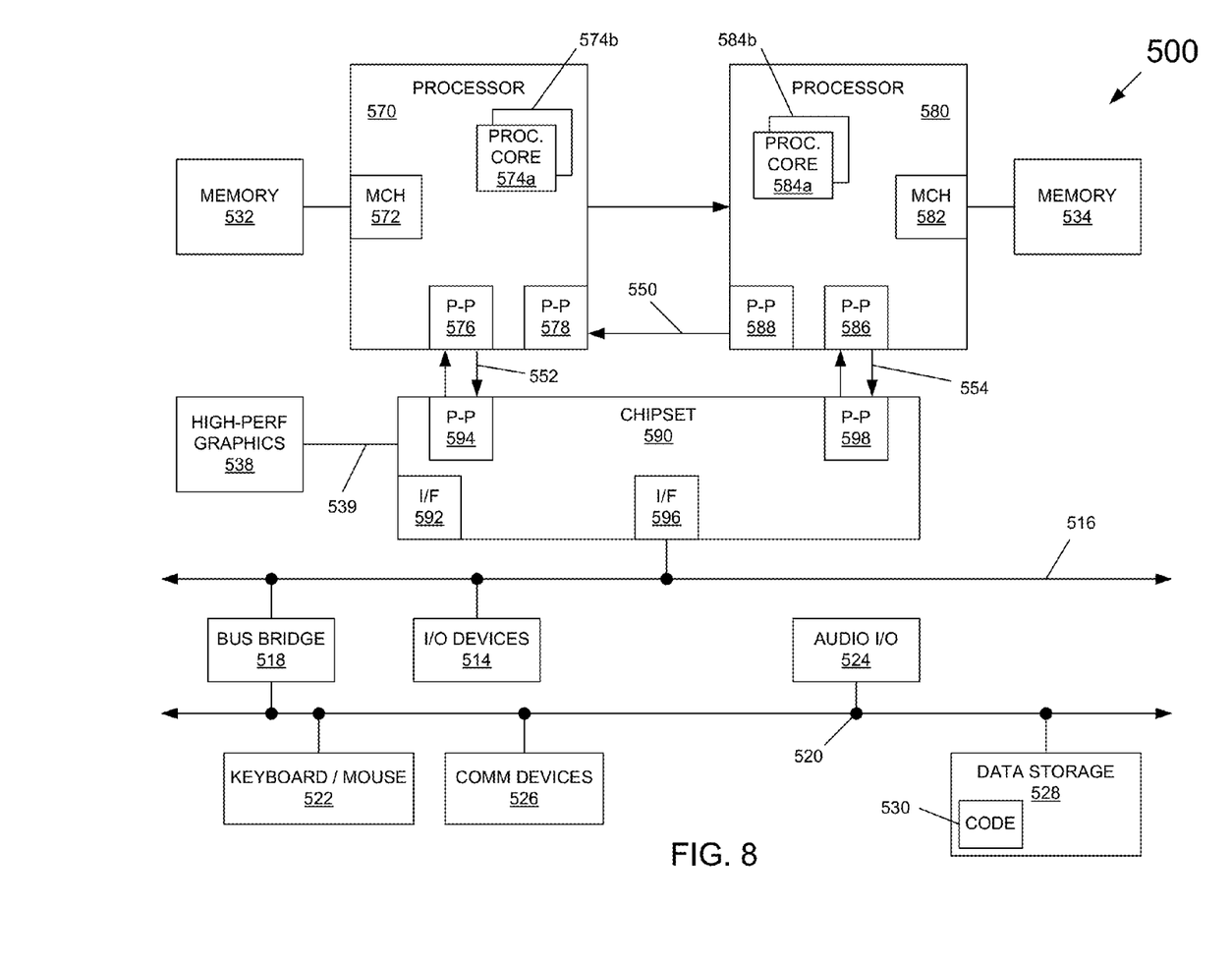
FIG. 8 is a block diagram of a system in accordance with an embodiment of the present invention.

Embodiments may be implemented in many different system types. Referring now to FIG. 8, shown is a block diagram of a system in accordance with an embodiment of the present invention. As shown in FIG. 8, multiprocessor system 500 is a point-to-point interconnect system, and includes a first processor 570 and a second processor 580 coupled via a point-to-point interconnect 550. As shown in FIG. 8, each of processors 570 and 580 may be multicore processors, including first and second processor cores (i.e., processor cores 574a and 574b and processor cores 584a and 584b), although potentially many more cores may be present in the processors. Each of the processors can include a PCU or other logic to perform dynamic allocation of a package power budget between multiple domains of the processor, as described herein.

Still referring to FIG. 8, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 8, MCH's 572 and 582 couple the processors to respective memories, namely a memory 532 and a memory 534, which may be portions of system memory (e.g., DRAM) locally attached to the respective processors. First processor 570 and second processor 580 may be coupled to a chipset 590 via P-P interconnects 552 and 554, respectively. As shown in FIG. 8, chipset 590 includes P-P interfaces 594 and 598.

Furthermore, chipset 590 includes an interface 592 to couple chipset 590 with a high performance graphics engine 538, by a P-P interconnect 539. In turn, chipset 590 may be coupled to a first bus 516 via an interface 596. As shown in FIG. 8, various input/output (I/O) devices 514 may be coupled to first bus 516, along with a bus bridge 518 which couples first bus 516 to a second bus 520. Various devices may be coupled to second bus 520 including, for example, a keyboard/mouse 522, communication devices 526 and a data storage unit 528 such as a disk drive or other mass storage device which may include code 530, in one embodiment. Further, an audio I/O 524 may be coupled to second bus 520. Embodiments can be incorporated into other types of systems including mobile devices such as a smart cellular telephone, tablet computer, netbook, or so forth.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a multi-domain processor including a first domain and a second domain, each of the first and second domains to operate at an independent voltage and frequency, the multi-domain processor further including first logic to dynamically allocate a power budget for the multi-domain processor between the first and second domains at run time, wherein the first logic is to dynamically allocate substantially all of the power budget to the first domain for a first workload, and to dynamically allocate substantially all of the power budget to the second domain for a second workload executed after the first workload.

2. The apparatus of claim 1, wherein the first logic is to dynamically allocate the power budget according to a first sharing policy value for the first domain and a second sharing policy value for the second domain, the first and second sharing policy values controllable by user-level software.

3. The apparatus of claim 2, wherein the first logic is to determine a portion of the power budget to allocate to the first domain based on the first sharing policy value.

4. The apparatus of claim 2, wherein the first logic is to dynamically allocate the power budget further according to a first minimum reservation value for the first domain and a second minimum reservation value for the second domain, the first and second minimum reservation values controllable by the user-level software.

5. The apparatus of claim 4, wherein the first logic is to provide at least a first portion of the power budget to the first domain, the first portion corresponding to the first minimum reservation value.

6. The apparatus of claim 1, wherein the first logic is to determine the power budget for a current time interval based at least in part on a power budget carried forward from a previous time interval, a power consumed in the previous time interval, and a power budget decay value.

7. The apparatus of claim 6, wherein the first logic is to determine the power budget according to $E_n = E_{n-1}*alpha + (1-alpha)*(Power\_Limit*deltaT - Energy)$, where:

$E_n$ is the power budget for the current time interval;
$E_{n-1}$ is the power budget carried forward from the previous time interval;
Power_limit is a threshold power level;
deltaT is a length of the time interval;
Energy is the power consumed during the previous time interval; and
alpha is the power budget decay value.

8. A method comprising:
determining, in a power controller of a multi-domain processor, a power budget for the multi-domain processor for a current time interval, the multi-domain processor including at least a first domain and a second domain;
determining, in the power controller, a portion of the power budget to be allocated to the first and second domains, including allocating a minimum reservation value to the first domain and a minimum reservation value to the second domain, and sharing a remaining portion of the power budget according to a first sharing policy value for the first domain and a second sharing policy value for the second domain; and
controlling a frequency of the first domain and a frequency of the second domain based on the allocated portions.

9. The method of claim 8, wherein determining the portion of the power budget to be allocated to the first and second domains includes allocating the power budget to the second domain and not to the first domain if the power budget is less than the minimum reservation value for the second domain.

10. The method of claim 9, further comprising obtaining the minimum reservation value for the second domain from a configuration register written by user-level software.

11. The method of claim 9, further comprising allocating the minimum reservation value for the second domain to the second domain, and allocating a remaining portion of the power budget to the first domain when the power budget is greater than the minimum reservation value for the second domain but less than a sum of the minimum reservation value for the second domain and the minimum reservation value for the first domain.

12. The method claim 8, wherein the first sharing policy value is to be incremented when a request for a higher frequency for the first domain is not granted, and the second sharing policy value is to be incremented when a request for a higher frequency for the second domain is not granted.

13. A system comprising:
a multicore processor having a first domain including a plurality of cores, a second domain including a graphics engine, and a third domain including system agent circuitry, the third domain to operate at a fixed power budget and to dynamically allocate a variable power budget between the first and second domains, wherein the system agent circuitry includes a power sharing logic to determine the variable power budget for a current time interval and to allocate a first portion of the variable power budget to the first domain according to a first power sharing value for the first domain, and to allocate a second portion of the variable power budget to the second domain according to a second power sharing value for the second domain; and
a dynamic random access memory (DRAM) coupled to the multicore processor.

14. The system of claim 13, wherein the power sharing logic is to dynamically allocate substantially all of the variable power budget to the first domain for a first workload, and to dynamically allocate substantially all of the variable power budget to the second domain for a second workload executed after the first workload.

15. The system of claim 13, wherein the power sharing logic is to increment the first power sharing value when a request for a higher frequency for the first domain is not granted, and to increment the second power sharing value when a request for a higher frequency for the second domain is not granted.

16. The system of claim 13, wherein the power sharing logic is to further allocate the first portion of the variable power budget according to a first minimum reservation value for the first domain and allocate the second portion of the variable power budget according to a second minimum reservation value for the second domain.

17. The system of claim 13, wherein the power sharing logic is to further allocate the variable power budget according to a preference value, the preference value to favor the second domain over the first domain.

\* \* \* \* \*